United States Patent [19]

Olschewski et al.

[11] 4,429,926
[45] Feb. 7, 1984

[54] THIN-WALLED BEARING BUSHINGS MANUFACTURED BY A DEEP DRAWING PROCESS

[75] Inventors: Armin Olschewski, Schweinfurt; Manfred Brandenstein, Eussenheim; Heinrich Kunkel, Schweinfurt; Hermann Hetterich, Heidenfeld; Peter Horling, Mainberg; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 284,190

[22] Filed: Jul. 17, 1981

[30] Foreign Application Priority Data

Jul. 18, 1980 [DE] Fed. Rep. of Germany ....... 3027262

[51] Int. Cl.³ .................... F16C 33/58; F16C 33/64
[52] U.S. Cl. .................................. 308/216; 464/128
[58] Field of Search ................. 384/129, 276, 420; 308/216, 212, 207 R, 178; 464/128

[56] References Cited

U.S. PATENT DOCUMENTS

| | | | |
|---|---|---|---|
| 4,067,626 | 1/1978 | McElwain | 308/207 R |
| 4,154,065 | 5/1979 | Diffenderfer . | |
| 4,154,490 | 5/1979 | Köhler et al. | 308/187.2 |

Primary Examiner—Lenard A. Footland
Attorney, Agent, or Firm—Eugene E. Renz, Jr.

[57] ABSTRACT

Thin-walled bearing bushing produced in a drawing process for the support of pins in universal joints comprising an elongated generally cylindrical sleeve section and a bottom section forming an end closure at one axial end of said sleeve section, the juncture of the peripheral surface of said sleeve section and the outer axial end face of said bottom section defining an outer rim having at least portions of a small cross sectional radius (r), and means defining at least a pair of separate circumferentially extending spaced grooves in the bottom section adjacent said peripheral rim.

6 Claims, 6 Drawing Figures

THIN-WALLED BEARING BUSHINGS MANUFACTURED BY A DEEP DRAWING PROCESS

BACKGROUND AND SUMMARY OF THE INVENTION

The present invention relates to thin-walled bearing bushings produced by a drawing process particularly suitable for the support pins in universal joints. Typically, these bushings comprise an elongated generally cylindrical sleeve section and a bottom section or wall at one axial end of the sleeve section so that the outer peripheral surface of the sleeve section and the exterior face of the bottom section are joined at a peripheral edge which is of a comparatively small cross sectional radius. The bushing includes a continuous groove located radially inwardly and extending axially into either the exterior or the interior surface of the bottom section in the vicinity of the peripheral edge.

A thin-walled bearing bushing manufactured by a deep drawing process is shown in pending application Ser. No. 218,520 filed Dec. 22, 1980, U.S. Pat. No. 4,377,313 which is owned by the assignee of the present application. The bearing bushing shown in this application has a groove which is radially limited toward the inside and located in the bottom section of the bearing bushing in the vicinity of the relatively sharp peripheral edge formed between the surface area of the sleeve and the exterior surface of the bottom section. While the prior bearing bushing is generally satisfactory, it has been found that relatively large shaping and pressing forces must be applied when the groove is formed which produces stresses affecting the material of the bearing bushing unevenly along the periphery particularly in the case of large diameter bearing bushings. Consequently, warpage may occur in the bearing bushing sidewall during the deep drawing of the thin-walled sleeve section of the bearing bushing. As a result, the precision or accuracy of the configuration of the bearing bushing manufactured by a deep drawing process may not always be satisfactory, particularly in the case of large bearing bushings.

With the above in mind, it is an object of the present invention to improve bearing bushings of this type so that they possess a high degree of precision in configuration even in large diameter sizes. It is also an object to provide a means for manufacturing the bearing bushings economically utilizing relatively low molding or drawing forces. To this end, in accordance with the present invention, several grooves of arcuate configuration and separated from one another are provided in the outer or interior face of the bottom section adjacent the edge defining the juncture between the sleeve section and the bottom section. The advantage of this construction is that the grooves in the bottom section can be formed with relatively small shaping and pressing forces of the extrusion die in the matrix. In this manner, a peripheral edge with a requisite small cross sectional radius is formed at least in the area of the grooves. Furthermore, by using discrete grooves in the bottom section, there is a limited material flow towards the periphery during impression of the grooves into the exterior or interior surface of the bottom section. Further, by spacing the grooves, areas with a full wall thickness bridge the grooves. These bridge areas contribute advantageously to the rigidity of the bearing bushing so that the bearing bushing will retain its predetermined shape after being removed from the drawing matrix during transportation and installation in universal joints. The problem of detrimental oval deformation due to residual stress in the groove area which may occur particularly in the case of bearing bushings with large diameters is eliminated.

The grooves are preferably of a V-shaped cross section which widen outwardly in the peripheral direction by reason of the oppositely slanted surfaces at the terminal ends thereof. The purpose of this arrangement is to facilitate material flow in a peripheral direction and thereby during impression of the grooves obtain sections with a true shape between adjacent grooves in the bottom section of the bearing bushing.

The grooves also widen outwardly in a radial direction thereby facilitating flow of material during formation of the grooves and mold a peripheral edge with relatively small cross sectional radius.

In accordance with another feature of the present invention, the grooves at the periphery of the bottom section are formed alternately in the interior and the exterior surface of the bottom section. By doing it in this fashion, the formation of the grooves requires minimal axial force of the drawing ram and the counter ram since for both dies there is only a small number of relatively small grooves to be pressed into the bottom section of the bearing bushing.

DESCRIPTION OF THE DRAWINGS

These and other objects of the present invention of the various features and details of the operation and construction thereof are hereinafter more fully set forth with reference to the accompanying drawings, wherein.

DESCRIPTION OF THE PREFERRED EMBODIMENTS

Figure 1:
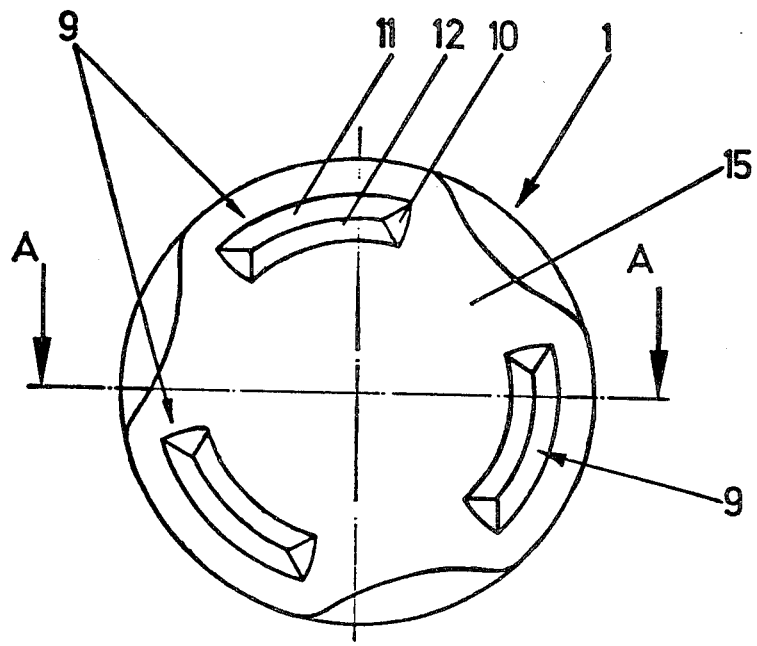
FIG. 1 is a bottom plan view showing the bottom section of a thin-walled bearing bushing made in accordance with the present invention.
Figure 2:
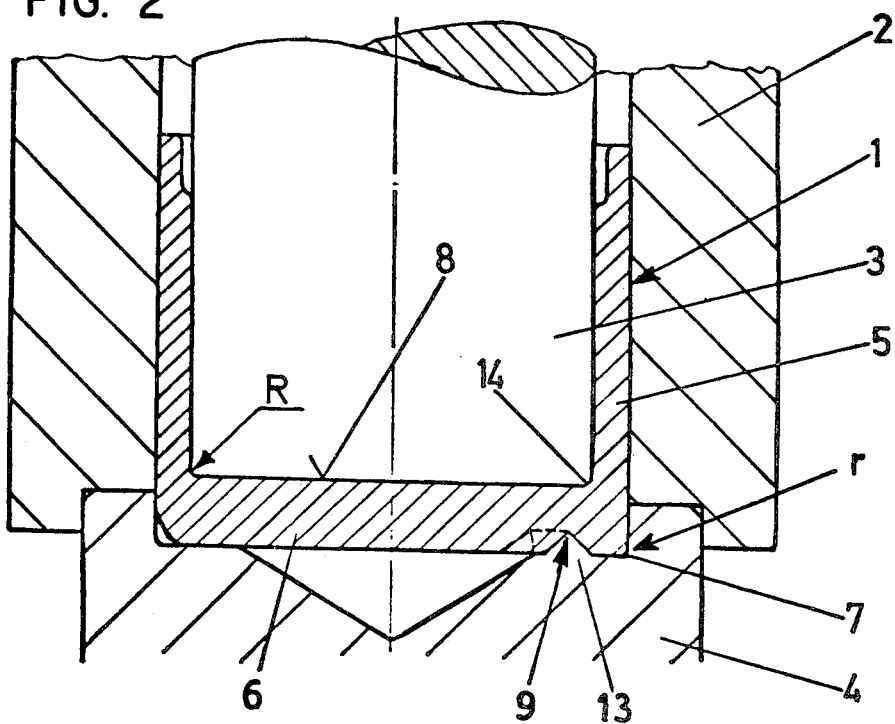
FIG. 2 is a longitudinal cross sectional view taken along lines A—A of FIG. 1 showing the bearing bushing in position in the drawing apparatus.

Referring now to the drawings and particularly to FIGS. 1 and 2 thereof, there is illustrated a thin-walled bearing bushing 1 in accordance with the present invention particularly adapted for the support pins (not shown) in universal joints. FIG. 2 shows the bearing bushing 1 in the bore of a die or matrix 2. In the die 2, the bearing bushing is formed from a band of material by means of a drawing ram or die 3 and a counter ram 4 in a drawing process. The material from which the bearing bushing is made or drawn may be strip steel for deep drawing.

As illustrated, the bearing bushing comprises an elongated generally cylindrical sleeve section 5 and a bottom section 6 which closes one axial end of the sleeve section 5. A peripheral edge 7 of relatively small cross sectional radius r is formed at the exterior juncture of the outer peripheral surface of the sleeve section 5 and the outer axial end face 6a of the bottom section 6. In the present instance, the inner axial face 8 of the bottom surface is planar and at the transition with the interior inner face 8 to the cylindrical inner peripheral surface 5a of the sleeve section, a chamfer 14 is formed having a cross sectional radius R. The cross sectional radius R of the chamfer 14 is considerably greater than the cross sectional radius r of the peripheral edge 7.

In accordance with the present invention, a plurality of discrete grooves 9, in the present instance three (3) have been impressed axially into the outer axial end face 6a of the bottom section 6 which as illustrated are disposed adjacent the peripheral edge 7 and spaced from the center of the bottom section. These grooves 9 are radially limited towards the center and are arranged at the periphery of the outer portion of the outer axial end face 6a of the bottom section 6. Each groove 9 is shaped as an elongated arcuate channel generally parallel to the peripheral edge 7 which fan out in a peripheral direction and are widened at their terminal ends in the peripheral direction by outwardly slanted terminal border areas 10. Each groove is of generally V-shaped cross section being widened outwardly by means of the slanted or tapered border areas 11 and widened inwardly by means of the tapered or slanted border areas 12.

Consider now production of bearing bushings in accordance with the present invention. The counter ram 4 as illustrated in FIG. 2 has a series of circumferentially spaced projections 13 on the face confronting the drawing ram 3 so that when the strip material is positioned in the die or matrix 2, the material of the bottom section 6 is displaced radially outwardly towards the peripheral edge 7 to form a peripheral edge of relatively small cross sectional radius r at least in the area coextensive with the grooves 9. Bridge sections 9a are left between the adjacent grooves 9 which are of a full thickness equal to the bottom of section 6 thereby providing an advantageously rigid connection of the bottom section 6 with the sleeve section of the bearing bushing.

Figure 3:
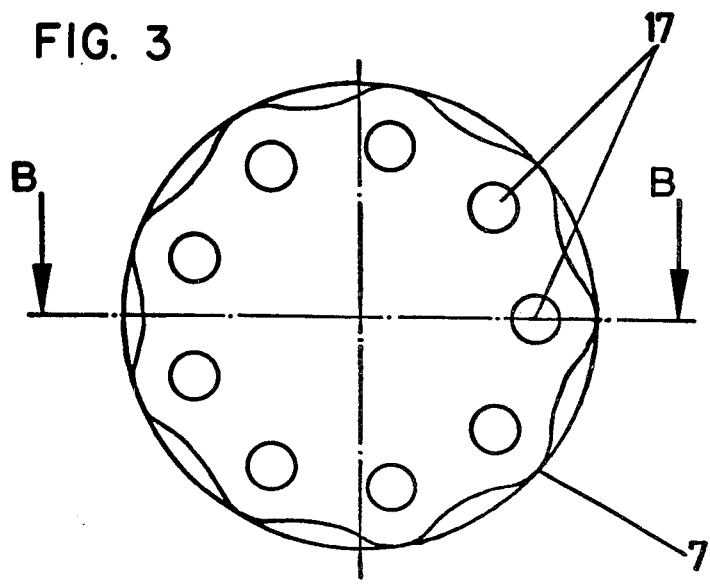
FIG. 3 is a bottom plan view of a modified bottom section of a thin-walled bearing bushing in accordance with the present invention.
Figure 4:
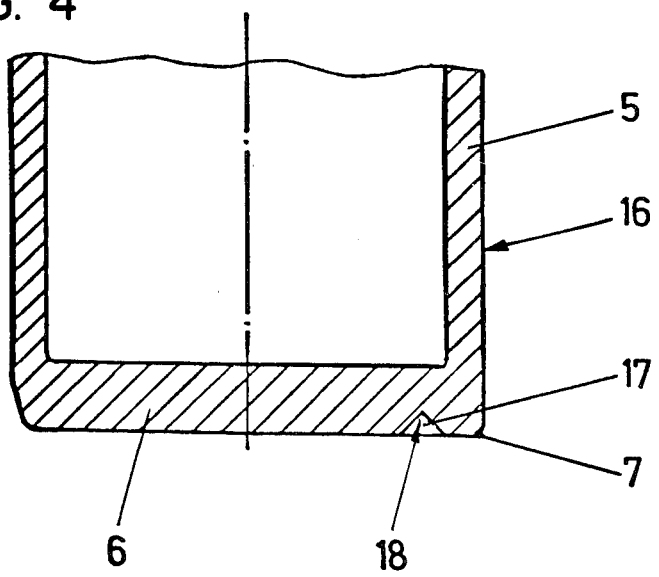
FIG. 4 is a longitudinal cross sectional view taken on lines B—B of FIG. 3.

There is as illustrated in FIGS. 3 and 4 a modified bearing bushing 16 in accordance with the present invention. The bearing bushing may be formed in a deep drawing process including a drawing ram and a counter ram as in the previously described embodiments. However, in this instance the counter ram has a series of pointed conical projections which form a row of circumferentially equispaced conical depressions 17 along the periphery of the outer face of the bottom section 6. These depressions 17 as illustrated, have perimeter or border surfaces 18 which are conical and widen the depressions outwardly. This, therefore, produces a relatively sharp peripheral edge 7 in the area of the depression 17 having a relatively small cross sectional radius r.

Figure 5:
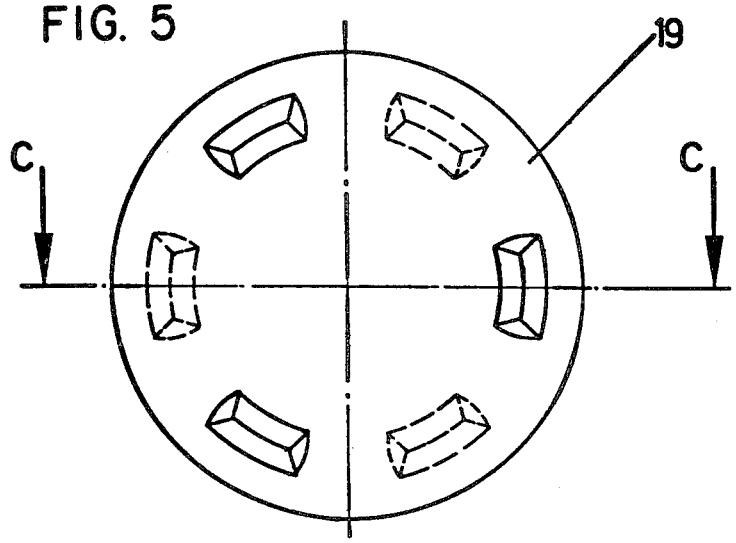
FIG. 5 is a bottom plan view of a still further modified bottom section of a thin-walled bearing bushing in accordance with the present invention.
Figure 6:
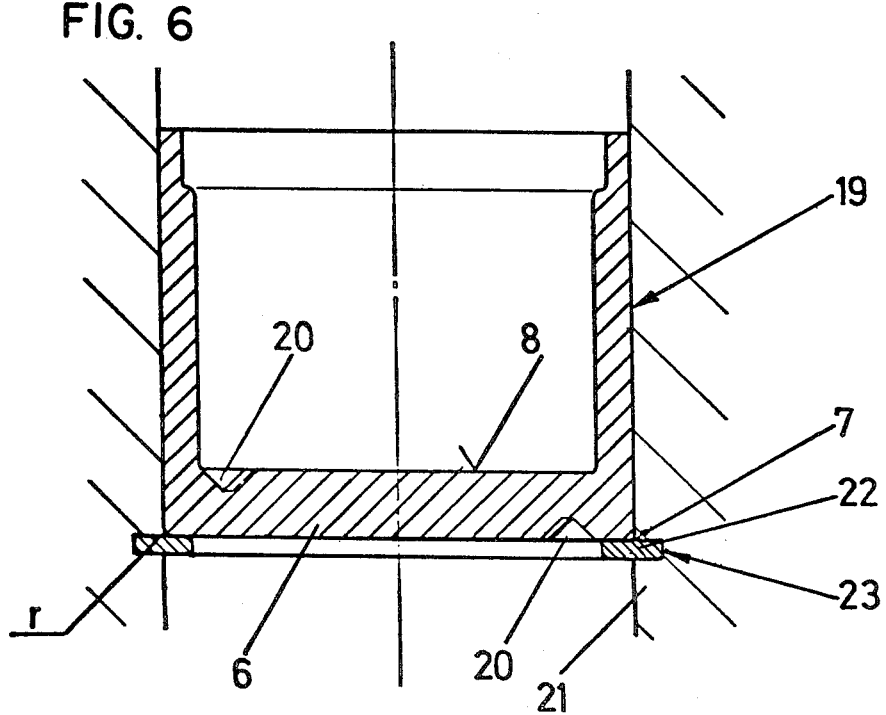
FIG. 6 is a sectional view of the bushing taken on lines C—C of FIG. 5.

FIG. 5 shows still another modification of a bearing bushing 19 in accordance with the present invention. In this instance, the depressions or grooves 20 are circumferentially spaced adjacent the periphery of the bottom section. However, in this instance they are molded alternately into the outer axial end face 6a and the inner axial end face 8 of the bottom section 6. In this instance, the ram has three comparatively small projections formed on the face thereof confronting the inner axial wall of the bottom section and the counter ram has likewise three projections which are circumferentially staggered relative to those on the drawing ram to produce the pattern of depressions in the inner and outer end faces of the bottom section illustrated in FIG. 5. This arrangement has the advantage that while the bearing bushing 19 is drawn, comparatively small minimal pressures or forces are applied to the ram and counter ram to produce the desired arcuate grooves in the pattern and array shown in FIG. 5. In this manner when the grooves or depressions 20 are formed or molded, a peripheral edge 7 is formed of a comparatively small radius r. The advantage of a small radius at this juncture is that when the bearing bushing is mounted in a typical universal joint in an assembled position, it rests in the bore 21a of the fork 21 of the universal joint and is axially held in place at the bottom section by a snap ring 23 which seats in a peripheral groove in the bore of the housing or fork 21. With a relatively small cross sectional radius r, the outer face of the bottom of the bottom section 6 of the bushing engages and abuts the snap ring 22 in the immediate vicinity of the bore of the housing 21. Thus the snap ring 22 is exposed to sheer stresses only and not to bending stresses from the axial load from the bearing bushing 19. Bending stress would result in undesirable axial elasticity of the snap ring 22 and potentially failure of the snap ring 22 during operation.

Even though particular embodiments of the present invention have been illustrated and described herein, it is not intended to limit the invention and changes and modifications may be made herein within the scope of the following claims. For example, the grooves or depressions 17 of the FIG. 3 embodiment may be impressed or stamped into the outer axial end face of the bottom section at closer intervals so that a relatively sharp peripheral edge 7 is formed in the drawing of the bearing bushing not only in the area of the depressions 17 but also in the intervals between these depressions.

What is claimed is:

1. Thin-walled bearing bushing produced in a drawing process for the support of pins in universal joints comprising an elongated generally cylindrical sleeve section and a bottom section forming an end closure at one axial end of said sleeve section, the juncture of the peripheral surface of said sleeve section and the outer axial end face of said bottom section defining an outer rim having at least portions of a cross-sectional radius (r) smaller than the cross-sectional (R) at the juncture of the inner peripheral surfaces of the sleeve section and the inner axial end face of the bottom section and means defining at least a pair of separate grooves in the bottom section circumferentially spaced from one another and being disposed adjacent said peripheral rim.

2. A bearing bushing as claimed in claim 1 wherein each of said grooves is widened outwardly in the peripheral direction by means of a slanted surface.

3. A bearing bushing as claimed in claim 1 wherein each groove is widened outwardly in the radial direction by means of a slanted surface.

4. A bearing bushing as claimed in claim 1 wherein said grooves are of V-shaped cross section.

5. A bearing bushing as claimed in claim 1 wherein alternate ones of said grooves are impressed into the outer axial end face of the bottom section and grooves intermediate said alternate ones are impressed into the inner axial end face of said bottom section.

6. Thin-walled bearing bushing produced in a drawing process for the support of pins in universal joints comprising an elongated generally cylindrical sleeve section and a bottom section forming an end closure at one axial end of said sleeve section, the juncture of the peripheral surface of said sleeve section and the outer axial end face of said bottom section defining an outer rim having at least portions of a cross-sectional radius (r) smaller than the cross-sectional (R) at the juncture of the inner peripheral surfaces of the sleeve section and the inner axial end face of the bottom section and means defining a series of circumferentially closely spaced conical depressions in the outer axial end face of said bottom section closely adjacent said peripheral rim.

* * * * *